E. F. ANDERSON.
STRAW RACK.
APPLICATION FILED JUNE 25, 1919.

1,388,912.

Patented Aug. 30, 1921.

Inventor:
Emil F. Anderson,
By Chas. E. Lord
Att'y.

UNITED STATES PATENT OFFICE.

EMIL F. ANDERSON, OF CHICAGO, ILLINOIS, ASSIGNOR TO INTERNATIONAL HARVESTER COMPANY, A CORPORATION OF NEW JERSEY.

STRAW-RACK.

1,388,912.     Specification of Letters Patent.     Patented Aug. 30, 1921.

Application filed June 25, 1919. Serial No. 306,578.

*To all whom it may concern:*

Be it known that I, EMIL F. ANDERSON, a citizen of the United States, residing at Chicago, in the county of Cook and State of Illinois, have invented certain new and useful Improvements in Straw-Racks, of which the following is a full, clear, and exact specification.

This invention relates to straw racks or straw walkers for threshing machines, and more particularly adapted for harvester threshers.

Harvester threshers, as is well known, are propelled through the field of grain and cut and thresh the standing grain in the field. In view of this fact it will be evident that machines of this character are called upon to meet a variety of conditions.

In threshing machines the straw racks or straw walkers are positioned in the rear of the threshing mechanism, such as cylinders, and receive the straw from the threshing cylinders. The function of the straw walkers is to agitate the straw, thereby shaking out any loose grain which is retained in the straw, and to conduct the straw rearwardly, discharging it from the machine.

When the crop of grain is heavy a large amount of material passes over the straw racks, and when the crop is light a comparatively small amount of straw is acted upon.

In order to efficiently remove the grain from the straw when the machine is handling a heavy crop, it has been found necessary to allow a considerable number of the unthreshed heads to pass through the straw racks to the separator mechanism, whereas, when the machine is operated in a light crop, the grain may be sufficiently removed by the straw walkers themselves and it is therefore not necessary to allow any appreciable part of the unthreshed heads to pass through the straw rack.

The present invention has for its object, therefore, to provide a construction which is adapted to meet the various conditions encountered in the field, and to efficiently separate the straw from the grain under varying conditions.

The objects above outlined are accomplished in the present instance by providing in connection with the usual straw rack a series of longitudinal rods. these rods being made removable whereby the amount of unthreshed heads passing through the rack may be controlled.

One embodiment of the invention has been illustrated in the drawings, and

Figure 1:
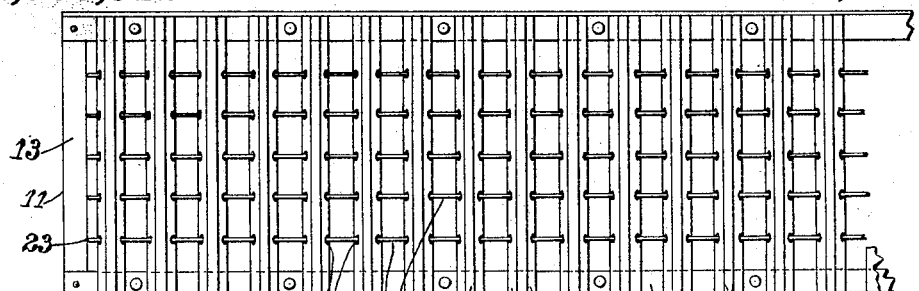
Figure 1 shows a top plan view of the improved straw walker.
Figure 2:
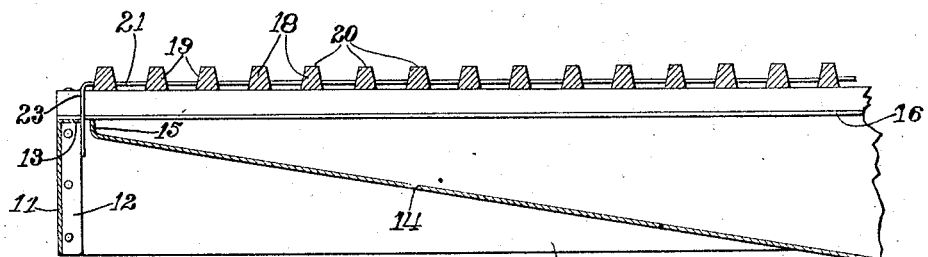
Fig. 2 is a longitudinal sectional view of the construction shown in Fig. 1.

The straw rack or straw walker in connection with which my invention is illustrated is provided with the usual casing comprising side walls 10 and a rear wall member 11 which has forwardly extending side flanges 12 formed integrally therewith and fastened to the side walls 10 by means of rivets. The member 11 has a forwardly extending top flange 13, the purpose of which is hereinafter described. The side walls 10 have secured thereto in any suitable manner, a bottom member 14 which is inclined upwardly and rearwardly, the extreme rear portion being bent upwardly to form a substantially vertical end wall 15. The upper edges of the walls 10 are provided with inwardly extending flanges 16 which have secured thereto in any desired manner longitudinal frame members 17 which may be formed of metal or wood as desired, and these frame members receive the opposite ends of a plurality of transverse slats 18, the slats being securely fixed to the frame side members. The slats 18 form the usual cross slats of the straw walkers and may be constructed of wood or metal, the front and rear faces of the slats being inclined as shown at 19 and the upper surfaces being comparatively narrow as shown at 20. It should be understood that the particular form of cross slats utilized is not important, and that any desired form may be used in connection with my invention.

The construction of the straw walker above set forth is not novel and no novelty is claimed *per se*, as any other of the ordinary constructions may be substituted and may be utilized in connection with the invention.

Figure 3:
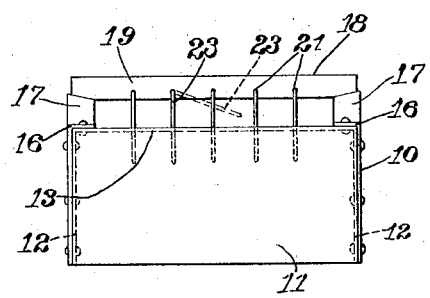
Fig. 3 is a rear elevation of the construction shown in Fig. 2.

The invention which I desire to claim in this application consists in providing a plurality of longitudinal rods 21 which are spaced transversely on the straw walkers and pass through alined apertures 22 formed in the respective cross slats 18. Each of the rods 21 is bent laterally at its rear end as shown at 23, the ends 23 being disposed in rear of the vertical wall 15 of the rack. Thus it will be seen that the vertical wall 15 with the rearwardly extending flange 13 retain the rods 21 in position. Each of the rods is longitudinally movable in the cross slats and may be removed by simply turning the end 23 to the dotted line position shown in Fig. 3, after which the rod may be withdrawn rearwardly from the straw walker.

It is believed that the operation of this simple device will be clear without a detailed description thereof, but a brief description is given below.

When the walker is called upon to handle a light crop or small amount of grain, sufficient separation of the threshed grain from the straw will be obtained if the rods are inserted in the cross slots as shown in Fig. 1. However, if the walker is called upon to handle a large amount of grain, the grain cannot be entirely separated from the unthreshed heads in the straw walker and therefore it is necessary to allow some of the unthreshed heads to pass through the straw walker to the separating mechanism. When this condition is to be met, as many of the rods 21 as desired may be withdrawn from the cross slats, thereby permitting a greater amount of unthreshed heads to pass downwardly between the cross slats to the separating mechanism.

Having described in detail my improved construction, I wish to call particular attention to the simplicity of the structure and to emphasize the fact that the rods 21 may be formed from stock material and may be used in connection with any of the ordinary straw walkers or racks.

While I have in the specification described one specific embodiment of my invention, it will be clear that other forms may suggest themselves and that the invention is capable of many modifications. I do not desire, therefore, to be limited to the particular construction defined above, but intend to cover all such modifications and arrangements in the following claims:

1. In a straw walker, a casing, a plurality of cross slats carried thereby, and a plurality of longitudinally removable members carried by said cross slats, and said members having angularly disposed portions to prevent their longitudinal displacement.

2. In a straw walker, a casing comprising side walls and an end wall, a plurality of cross slats carried by said casing, and a longitudinal member carried by said cross slats and having a portion thereof loosely engaging said end wall.

3. In a straw walker, a casing having side walls and an end wall, a plurality of cross slats carried by said casing, and a plurality of longitudinal members having angularly disposed portions adapted to be moved into and out of engagement with said end wall.

4. In a straw walker, a casing having an end wall, a plurality of cross slats carried by said casing, and a removable longitudinal member carried by said cross slats and having a portion thereof engaging said end wall to prevent a longitudinal displacement of said member.

5. In a straw walker, a casing having an end wall, a plurality of cross slats having alined openings therein, and a plurality of removable rods carried by said cross slats and passing through said openings, said rods having laterally projecting portions for engaging said wall.

6. In a straw walker, a casing having an end wall, a plurality of cross slats carried by said casing and having alined openings therein, a plurality of rods carried by said cross slats and extending through said openings, the rear ends of said rods being bent laterally and adapted to be rotated and disengaged from said end wall.

7. In a straw walker, a casing, a plurality of cross slats carried thereby, a plurality of rods carried by said cross slats and rotatably and longitudinally movable with respect thereto, said rods having angularly disposed end portions, and means carried by said casing and adapted to be engaged by said end portions of said rods.

In testimony whereof I affix my signature.

EMIL F. ANDERSON.